(12) United States Patent
Tillett

(10) Patent No.: US 6,254,152 B1
(45) Date of Patent: *Jul. 3, 2001

(54) URN CARRYING DEVICE

(76) Inventor: Delsie D. Tillett, 1660 W. 35th St., Los Angeles, CA (US) 90018

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/334,360

(22) Filed: Jun. 16, 1999

(51) Int. Cl.[7] .............................. A61G 17/00; B65G 7/12
(52) U.S. Cl. .............................. 294/15; 294/144; 108/12; 108/26
(58) Field of Search ...................... 294/15, 32, 140–144, 294/167, 169, 172; 108/11, 12, 26, 38, 56.3, 157.1; 27/27, 28; 5/625–627; 248/126, 145.6

(56) References Cited

U.S. PATENT DOCUMENTS

| | | |
|---|---|---|
| D. 304,641 | 11/1989 | Bourassa . |
| 321,781 | 7/1885 | Barrett . |
| 709,332 | 9/1902 | Koons . |
| 1,923,617 | 8/1933 | Edensword . |
| 2,001,438 * | 5/1935 | Stuck ................................... 294/144 |
| 2,276,256 | 3/1942 | Visness et al. . |
| 2,652,300 * | 9/1953 | Graber et al. ........................... 108/38 |
| 2,695,826 * | 11/1954 | Henle ..................................... 294/144 |
| 2,758,899 * | 8/1956 | Smith et al. ......................... 294/144 |
| 2,829,705 * | 4/1958 | Godshalk et al. .................... 294/142 |
| 2,986,438 * | 5/1961 | Smathers et al. ....................... 108/26 |
| 3,247,529 * | 4/1966 | Benton ...................................... 5/625 |
| 4,177,737 * | 12/1979 | Brickman ............................... 108/11 |
| 4,648,162 | 3/1987 | Daino . |
| 5,005,784 | 4/1991 | Harden . |
| 5,586,376 * | 12/1996 | Enneking et al. ....................... 294/15 |
| 5,704,103 | 1/1998 | Crowley et al. . |
| 5,709,441 | 1/1998 | Bartling et al. . |
| 5,729,921 | 3/1998 | Rojas . |
| 5,794,318 | 8/1998 | Parker et al. . |
| 5,813,098 | 9/1998 | Schneider . |

* cited by examiner

*Primary Examiner*—Dean J. Kramer
(74) *Attorney, Agent, or Firm*—Sonnenschein Nath & Rosenthal

(57) ABSTRACT

The invention is embodied in a device for ceremoniously transporting an urn by at least two urnbearers comprising a flat surface having a top side and a bottom side. The top side further has a lip into which the urn is placed to minimize undesired movement of the urn. The device is further equipped with at least four protruding posts to be gripped by the urnbearers wherein the posts may be positioned on the bottom side of the flat surface to allow the device to function as a table.

16 Claims, 3 Drawing Sheets

FIG. 5
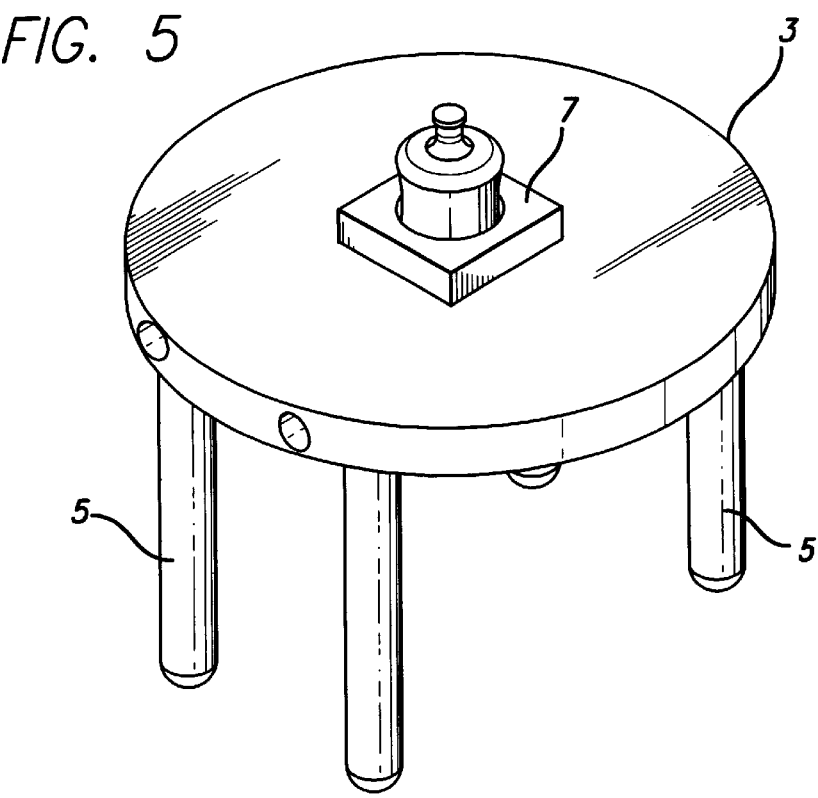
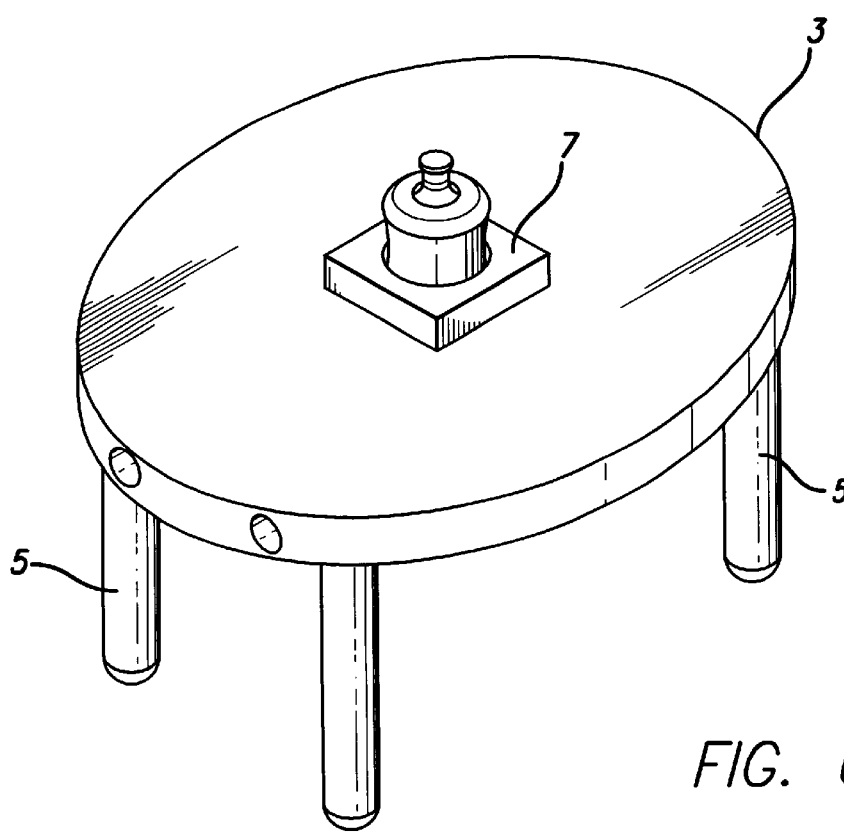
FIG. 6

URN CARRYING DEVICE

BACKGROUND OF THE INVENTION

1. Field of the Invention

The present invention relates to a device for carrying an urn during a ceremony such as a funeral.

2. Description of the Prior Art

Cremation has recently been gaining popularity among religious denominations where coffin burial has traditionally been the norm. Both the considerations of the deceased and the living influence the method by which the body of the deceased is laid to rest. Unlike traditional funerals wherein the deceased is placed into a coffin and the casket is brought into the church, temple or chapel via pallbearers, funerals in which the deceased was cremated historically have not contained this ceremonial element. Urns brought into the place of worship are simply placed in the desired location within the church or chapel before the accompanying ceremonies commence and before the attendees arrive. In the past, devices did not exist which would allow families of the deceased to ceremoniously bring the cremated remains into the place of worship.

Past inventions have either been aimed at coffin transportation or urn storage rather than a ceremonious urn carrying device. For example, U.S. Pat. No. 321,781 to Barrett describes a bier for transporting coffins wherein a rectangular wood fine with four posts extending from its corners may be carried by pallbearers. The frame is also equipped with legs so that when it is not being transported, four feet on pivoting hinges may be lowered and the bier placed on the ground. The slatted frame of the invention is geared towards holding caskets and cannot be used to ceremoniously transport urns.

U.S. Pat. No. 5,704,103 to Crowley et al. illustrates a fanciful urn display design wherein the cremated remains are placed within a small memorial. Unfortunately this arrangement is not ideal for transportation within the place of worship during any farewell ceremonies because it is not shaped for easy lifting by urnbearers.

U.S. Des. Pat. No. 304,641 to Bourassa also covers an elaborate glass enclosure urn display stand. This arrangement, while attractive and movable, cannot be used both as a display and a means for transporting an urn during a funeral service.

In view of the above, it should be appreciated that there is a need for a device permitting an urn to be transported during a funeral ceremony by a group of urnbearers. The present invention satisfies these long felt needs and provides other further related advantages.

SUMMARY OF THE INVENTION

The present invention is embodied in a device for ceremoniously transporting an urn by at lea it two urnbearers comprising a generally flat surface having a top side on which the urn is placed and a bottom side, a lip on the top side of said flat surface to minimize undesired movement of the urn, at least four protruding posts to be gripped by the urnbearers, wherein the posts may be positioned on the bottom side of said flat surface to allow said flat surface to act as a table.

Other features and advantages of the present invention will become apparent from the following description of the preferred embodiments, taken in conjunction with the accompanying drawings, which illustrate, by way of example, the principles of the invention.

BRIEF DESCRIPTION OF THE DRAWINGS

FIG. 5 is an isometric view of an urn carrying device with a circular flat surface; and FIG. 6 is an isometric view of an urn carrying device with an oval flat surface.

DETAILED DESCRIPTION OF THE EXEMPLARY EMBODIMENTS

Figure 1:
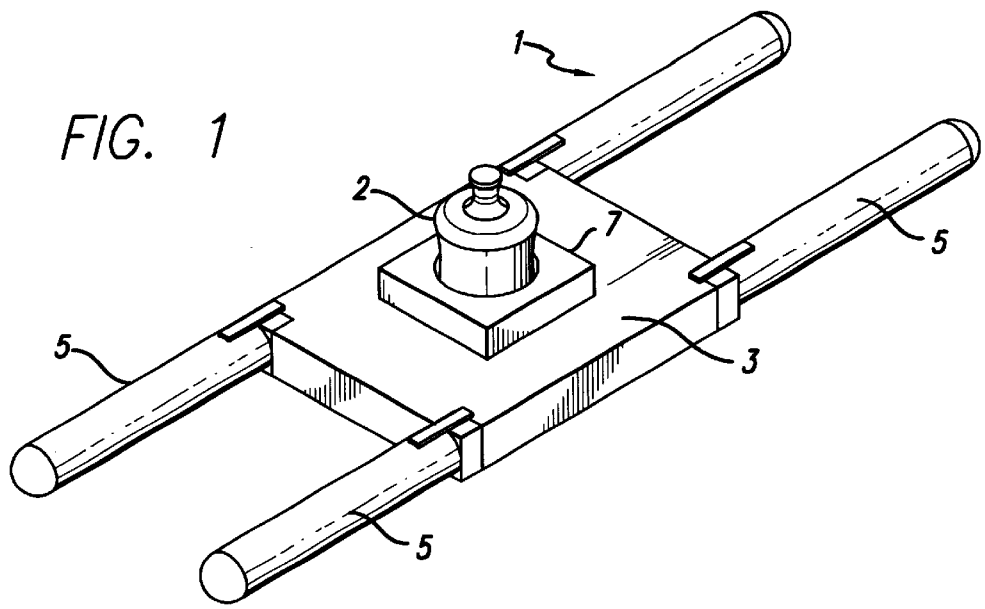
FIG. 1 is an isometric view of an urn carrying device holding an urn.

As shown in the accompanying exemplary drawings, particularly FIG. 1, the urn carrying device 1 for transporting and displaying an urn 2 is embodied in a generally flat surface 3 with top and bottom sides wherein the urn 2 may be placed. The flat surface may be circular (see FIG. 5), oval (see FIG. 6) or irregularly shaped and is illustrated here as rectangular for convenience only.

Movably attached to the flat surface are four posts 5 which are utilized by urnbearers (traditionally consisting of friends and family of the deceased) during the funeral ceremony to hold and transport the urn carrying device 1 with the urn 2 placed upon. Optionally, these posts have a series of grooves for increased gripping by the urnbearers. In the alternative, the posts may be covered with cloth, plastic, or rubber or any other substance facilitating the handling of the urn carrying device by the urnbearers.

A protruding lip 7 extends from the top side of the flat surface 3 to assist in minimizing undesired urn 2 movement when the urn carrying device 1 is being transported. The lip 7 may be shaped so as to snugly fit a standard size urn 2 within it or it may be adjustable. Preferably it is constructed from a semi-elastic material which can secure urns of various sizes. Optionally, the lip 7 may be formed from a series of holes forming a grid on the top side of the flat surface 3. These holes are combined with a series of pegs so as to allow the urnbearers to adjust the positioning of the lip 7 so that the urn carrying device 1 can snugly secure urns 2 of various sizes. The urn carrying device with the grid arrangement may also have a cover to conceal the grid when not in use (not shown). The lip 7 may also be flush with the flat surface 3 (see FIG. 4 discussed below) or it may be constructed from any other mechanism that prevents the urn 2 from sliding or tipping.

Figure 2A:
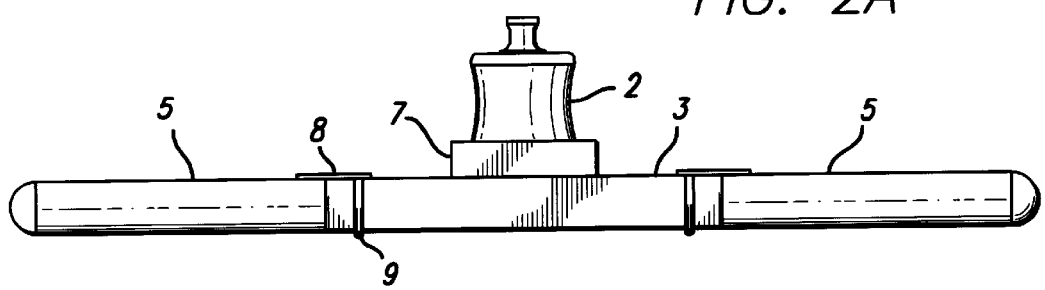
FIG. 2A is a side view of a first embodiment of the urn carrying device of FIG. 1 wherein said urn carrying device is in transportation mode.
Figure 2B:
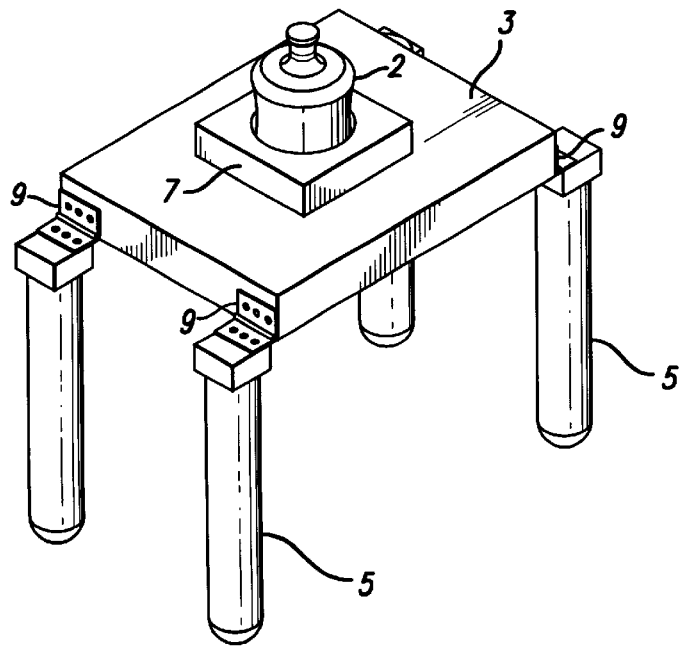
FIG. 2B is an isometric view of the embodiment of FIG. 2A wherein said urn carrying device is in a display mode.

All of the exemplary embodiments of the present invention permit the urn carrying device to be used as a table (i.e., an end table or a coffee table) after the funeral ceremony in remembrance of the deceased. In a first exemplary embodiment illustrated in FIGS. 2A–2B, the four posts 5 are affixed to the flat surface by a series of hinges 9 placed on the opposing ends of the flat surface. Optionally there may be removable clasps 8 on the top side of the flat surface 3 to prevent the posts 5 from swinging downwards. During or after the funeral ceremony, the four posts 5 may be rotated or pivoted underneath the flat surface 3 such that the functionality and appearance of the urn carrying device 1 is a table (see FIG. 2B). Optionally, the flat surface may be further outfitted with a series of handles for the urnbearers to grip when converting the urn carrying device into a table. The urn carrying device 1 may then be utilized as a coffee table, an end table or any other type of table depending on the size and shape of the flat surface 3.

Figure 3A:
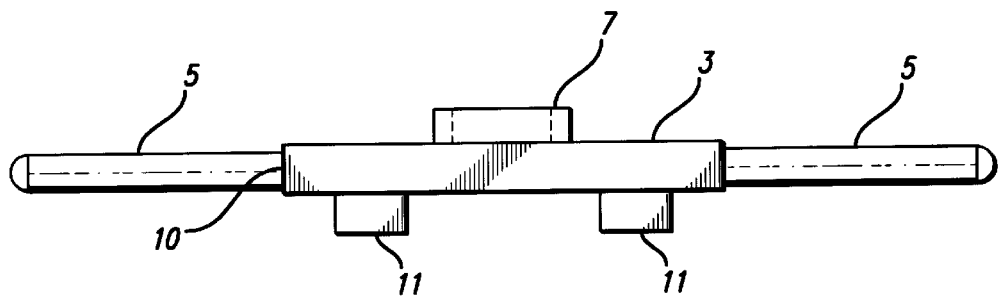
FIG. 3A is a side view of a second exemplary embodiment of an urn carrying device wherein said urn carrying device is in transportation mode.
Figure 3B:
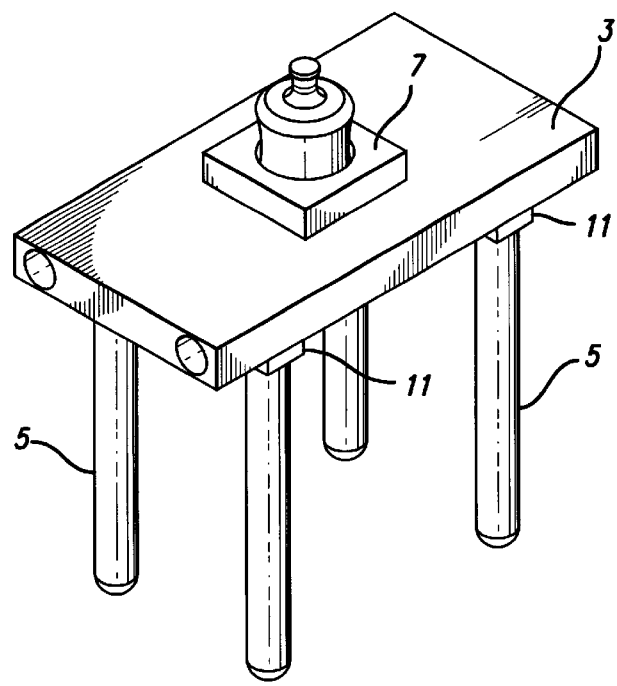
FIG. 3B is an isometric view of the exemplary embodiment of FIG. 3A wherein said urn carrying device is in a display mode.

In a second exemplary embodiment as seen in FIGS. 3A–3B, the four posts 5 are detachably held in contact with the flat surface 3 through braces 10 mounted on opposing ends of the flat surface 3 and shaped to fixably receive the posts. Clasps 8 may also be used in addition to the braces to further secure the posts 5. Optionally, the braces 10 may be equipped with a quick release bar to permit easy removal of the posts and the braces. The posts may also be secured by quarter turn locks in lieu of the braces 10. Once removed from the braces 10, the four posts 5 may be affixed to the bottom side of the flat surface by post receptacles 11. The receptacles 11 may also be braces, or they may comprise metal bands which may be screw tightened or secured through a quick release mechanism. Again, after the funeral ceremony, the four posts 5 may be rotated underneath the flat surface 3 such that the functionality and appearance of the urn carrying device 1 is a table (see FIG. 3B). The hardware (braces and or clasps) to secure the posts when in the transport mode may be completely removed such that the table is more attractive when arranged as a table. In this embodiment, as seen in FIG. 3B, the: lip 7 is a solid piece with a hole defining a structure wherein the urn 2 may be placed.

As seen in FIG. 3B, when the urn carrying device is positioned as a table, the recesses where the posts 5 fit are visible. Optionally, the urn carrying device may further include detachable plastic coverings may be employed to cover these exposed openings when the device is used as a table.

Figure 4:
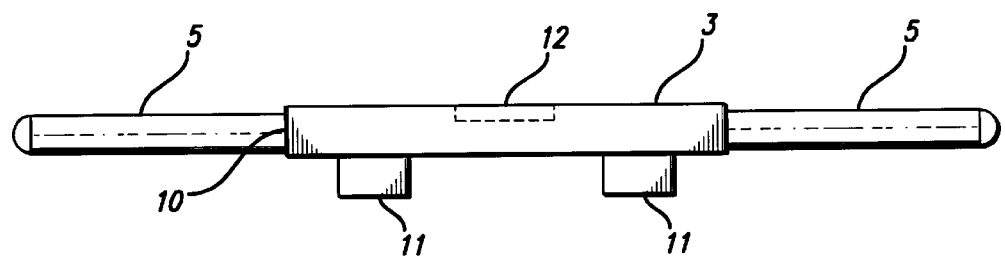
FIG. 4 is a side view of a third exemplary embodiment of an urn carrying device wherein said urn carrying device is in transportation mode.

In a third exemplary embodiment illustrated in FIG. 4, a support structure 12 replaces the lip 7 of the previous embodiments. The support structure 12 is flush with the flat surface 3 and extends downwards from the top side of the flat surface to a point above the bottom side of the flat surface. The support structure 12 is made up of a recess shaped so as to fit the base of an urn 2 within its confines. Depending on the shape of the urn 7 to be placed within the support structure 12, the support structure can be circular, oval, polygonal or irregularly shaped. As previously discussed in conjunction with the lip 7, one of ordinary skill in the art could devise adjustable support structures for securing urns of various sizes. In addition, it is within the ability of one of ordinary skill in the art to combine the support structure 12 with any of the leg/post configurations described above.

It is recognized by one of ordinary skill in the art that there are numerous techniques available for securing the urn during transportation. One of ordinary skill in the art recognizes that there are many different arrangements which would permit the transportation posts to act as table legs. Furthermore, one of ordinary skill in the art recognizes that the transportation posts may be aligned in any manner which would allow the urnbearers to handle and transport the urn carrying device.

While a particular form of the invention has been illustrated and described, it will be apparent that various modifications can be made without departing from the spirit and scope of the invention. Accordingly, it is not intended that the invention be limited, except as by the appended claims.

What is claimed is:

1. A device for ceremoniously transporting a funerary urn by at least two urnbearers and for ceremoniously displaying an urn on a supporting surface comprising:
   a generally flat surface having opposing ends, a top side on which the urn is placed, and a bottom side;
   a lip on the top side of the flat surface to minimize undesired movement of the urn; and
   at least four protruding posts to be gripped by the urnbearers, wherein the posts are connected to the flat surface by hinges positioned at the opposing ends of the flat surface, the posts are rotatable from a first position extending laterally away from the flat surface thereby permitting the urnbearers to hold the device in a horizontal position, to a second position extending transversely from the bottom side of the flat surface and configured to maintain the flat surface in a horizontal position relative to the supporting surface allowing the flat surface to act as a table.

2. The device for ceremoniously transporting urns in claim 1 wherein the flat surface is circular shaped.

3. The device for ceremoniously transporting urns in claim 1 wherein the flat surface is oval shaped.

4. The device for ceremoniously transporting urns in claim 1 wherein the flat surface is rectangular shaped.

5. A device for ceremoniously transporting a funerary urn by at least two urnbearers and for ceremoniously displaying an urn on a supporting surface comprising:
   a generally flat surface having opposing ends with braces, a top side on which the urn is placed, and a bottom side having post receptacles;
   a lip on the top side of the flat surface to minimize undesired movement of the urn; and
   at least four removable protruding posts to be gripped by the urnbearers, wherein the posts are movable from a first position where the posts interface the braces at the opposing ends of the flat surface and extend laterally away from the flat surface thereby permitting the urnbearers to hold the device in a horizontal position, to a second position where the posts interface the post receptacles and extend transversely from the bottom side of the flat surface and maintain the flat surface in a horizontal position relative to the supporting surface allowing the flat surface to act as a table.

6. The device for ceremoniously transporting urns in claim 5 wherein the flat surface is circular shaped.

7. The device for ceremoniously transporting urns in claim 5 wherein the flat surface is oval shaped.

8. The device for ceremoniously transporting urns in claim 5 wherein the flat surface is rectangular shaped.

9. A device for ceremoniously transporting a funerary urn by at least two urnbearers and for ceremoniously displaying an urn on a supporting surface comprising:
   a generally flat surface having opposing ends, a top side on which the urn is placed, and a bottom side;
   a structure defining a recess in the top side of the flat surface to minimize undesired movement of the urn; and
   at least four protruding posts to be gripped by the urnbearers, wherein the posts are connected to the flat surface by hinges positioned at the opposing ends of the flat surface, the posts are rotatable from a first position extending laterally away from the flat surface thereby permitting the urnbearers to hold the device in a horizontal position, to a second position extending transversely from the bottom side of the flat surface and configured to maintain the flat surface in a horizontal position relative to the supporting surface allowing the flat surface to act as a table.

10. The device for ceremoniously transporting urns in claim 9 wherein the flat surface is circular shaped.

11. The device for ceremoniously transporting urns in claim 9 wherein the flat surface is oval shaped.

12. The device for ceremoniously transporting urns in claim 9 wherein the flat surface is rectangular shaped.

13. A device for ceremoniously transporting a funerary urn by at least two urnbearers and for ceremoniously displaying an urn on a supporting surface comprising:

a generally flat surface having opposing ends with braces, a top side on which the urn is placed, and a bottom side having post receptacles;

a structure defining a recess in the top side of the flat surface to minimize undesired movement of the urn; and at least four removable protruding posts to be gripped by the urnbearers, wherein the posts are movable from a first position where the posts interface the braces at the opposing ends of the flat surface and extend laterally away from the flat surface thereby permitting the urnbearers to hold the device in a horizontal position, to a second position where the posts interface the post receptacles and extend transversely from the bottom side of the flat surface and maintain the flat surface in a horizontal position relative to the supporting surface allowing the flat surface to act as a table.

14. The device for ceremoniously transporting urns in claim 13 wherein the flat surface is circular shaped.

15. The device for ceremoniously transporting urns in claim 13 wherein the flat surface is oval shaped.

16. The device for ceremoniously transporting urns in claim 13 wherein the flat surface is rectangular shaped.

* * * * *